US012598461B2

(12) United States Patent
Maitre et al.

(10) Patent No.: US 12,598,461 B2
(45) Date of Patent: Apr. 7, 2026

(54) COMPUTER-IMPLEMENTED METHOD FOR CONNECTING A VEHICLE TO A WIRELESS LOCAL NETWORK OF A WORKSHOP

(71) Applicant: Volvo Truck Corporation, Gothenburg (SE)

(72) Inventors: Julien Maitre, Chuzelles (FR); Yann Quibriac, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 366 days.

(21) Appl. No.: 18/100,772

(22) Filed: Jan. 24, 2023

(65) Prior Publication Data

US 2023/0262462 A1 Aug. 17, 2023

(30) Foreign Application Priority Data

Feb. 16, 2022 (EP) .................................... 22156983

(51) Int. Cl.
H04W 12/08 (2021.01)
H04W 64/00 (2009.01)
(Continued)

(52) U.S. Cl.
CPC ........... H04W 12/08 (2013.01); H04W 64/00 (2013.01); H04W 76/11 (2018.02); H04W 76/38 (2018.02); *H04W 84/12* (2013.01)

(58) Field of Classification Search
CPC ..... H04W 12/08; H04W 64/00; H04W 76/11; H04W 76/38; H04W 84/12; H04W 48/04;
(Continued)

(56) References Cited

U.S. PATENT DOCUMENTS 10,104,547 B1 * 10/2018 Thanayankizil ........ H04W 4/44
11,238,672 B2 * 2/2022 Mallela .................. G08G 1/207
(Continued)

FOREIGN PATENT DOCUMENTS

CN          105357242 A      2/2016
EP            2753108 A2      7/2014

OTHER PUBLICATIONS

European Search Report, European Patent Application 22156983.3, mailed Jul. 20, 2022, 9 pages.
(Continued)

*Primary Examiner* — Azizul Choudhury
(74) *Attorney, Agent, or Firm* — Sage Patent Group

(57) ABSTRACT

The invention relates to a computer-implemented method for connecting a vehicle to a wireless local network of a workshop, comprising: identifying at least one wireless local network configuration of the wireless local network, said wireless local network configuration being associated with credentials for using said wireless local network, associating at least one validity parameter to said credentials in order to allow limited accessibility for the vehicle to said wireless local network, sending to a remote server said credentials, thereby enabling said credentials to be provided to the vehicle, upon receipt of a connection request including the credentials from the vehicle, checking the at least one validity parameter to determine that the credentials are still valid for the vehicle, and upon determination that the credentials are still valid, allowing the vehicle to connect to the wireless local network of the workshop.

17 Claims, 3 Drawing Sheets

(51) Int. Cl.
    *H04W 76/11*         (2018.01)
    *H04W 76/38*         (2018.01)
    *H04W 84/12*         (2009.01)

(58) Field of Classification Search
    CPC ... H04W 12/069; H04W 48/16; H04W 12/06;
               H04L 9/088; H04L 2209/80; H04L
            2209/84; H04L 63/0838; H04L 63/0846
    See application file for complete search history.

(56)               References Cited

U.S. PATENT DOCUMENTS

| | | | |
|---|---|---|---|
| 2012/0129493 A1* | 5/2012 | Vasudevan ............ | H04L 9/3271 |
| | | | 455/411 |
| 2016/0098870 A1* | 4/2016 | Bergerhoff .............. | H04W 4/48 |
| | | | 340/5.61 |
| 2018/0338329 A1* | 11/2018 | Sergakis ............... | H04W 48/20 |
| 2021/0287184 A1* | 9/2021 | Penilla ............. | G06Q 10/06314 |
| 2022/0237958 A1* | 7/2022 | Tzamaloukas ........... | G07C 5/08 |

OTHER PUBLICATIONS

"Chapter 13: Key Management Techniques ED—Menezes A J; Van Oorschot P C; Vanstone S A", Handbook of Applied Cryptography; XP001525013, Oct. 1, 1996, 49 pages.

\* cited by examiner

400

S1

S2

S3

S4

S5

S6

300

S1

S2

S2a

S3

S4

S5

200

S1

S2

S3

S4

S5

COMPUTER-IMPLEMENTED METHOD FOR CONNECTING A VEHICLE TO A WIRELESS LOCAL NETWORK OF A WORKSHOP

CROSS REFERENCE TO RELATED APPLICATIONS

This application claims priority to European Patent Application No. 22156983.3, filed on Feb. 16, 2022, the disclosure and content of which is incorporated by reference herein in its entirety.

TECHNICAL FIELD

The present disclosure relates to a computer-implemented method for connecting a vehicle to a wireless local network of a workshop. The present disclosure also relates to a computer program, a computer readable medium and a control unit.

The teachings of the present disclosure can, for instance, be applied to connecting heavy-duty vehicles to a wireless local network. For instance, the heavy-duty vehicles may be trucks, buses and construction equipment. However, the general inventive concept is not restricted to this particular vehicle, but may also be used in other vehicles such as cars.

BACKGROUND

Today when a vehicle is at a workshop, a communication interface may via a diagnostic cable be connected to a diagnostic connector of the vehicle. The communication interface can, in its turn, communicate with a diagnostic tool through various wired or wireless means. In the future it is envisaged that there will be a demand for communicating wirelessly directly using the equipment of the vehicle (e.g., Wi-Fi equipment of the vehicle), without needing to physically connect an intermediate communication interface. While the communication has historically been mostly between the vehicle and the diagnostic tool (via said physically connected communication interface), the direct communication may enable communication between many kinds of tools in the workshop or even with servers outside the workshop.

However, in privately owned workshops where the identities of wireless networks (such as the SSIDs) may vary from one workshop to another (or may even vary within the same workshop between two visits), it will be difficult for a vehicle to find a valid wireless network. Even if a valid wireless network is found, the vehicle will not have the corresponding credentials. The credentials are owned by the workshop and are sensitive data. Thus, the workshop owner may be reluctant to distribute the credentials in an uncontrolled manner.

SUMMARY

An object of the present disclosure is to provide a method for connecting a vehicle to a wireless local network of a workshop, which method at least partly mitigates the drawbacks of the prior art. This and other objects which will become apparent in the following disclosure are accomplished by a computer-implemented method according to claim 1. Some non-limiting exemplary embodiments are presented in the dependent claims.

The inventors of the present application have realized that by setting a limited validity of the credentials for a particular vehicle, and making the credentials with such limitations available to the vehicle in a secure manner, the workshop may maintain appropriate control over its sensitive data while facilitating the connection of that particular vehicle to the wireless network of the workshop, thereby making it possible to smoothly and efficiently diagnose the vehicle when it is taken in for, for example, repair or maintenance purposes. This will now be discussed in more detail with reference to a first aspect of the present disclosure.

According to a first aspect of the present disclosure, there is provided a computer-implemented method for connecting a vehicle to a wireless local network of a workshop, comprising:

identifying at least one wireless local network configuration of the wireless local network, said wireless local network configuration being associated with credentials for using said wireless local network, associating at least one validity parameter to said credentials in order to allow limited accessibility for the vehicle to said wireless local network, sending to a remote server said credentials, thereby enabling said credentials to be provided to the vehicle, upon receipt of a connection request including the credentials from the vehicle, checking the at least one validity parameter to determine that the credentials are still valid for the vehicle, upon determination that the credentials are still valid, allowing the vehicle to connect to the wireless local network of the workshop.

By the provision of a computer-implemented method which comprises the association of a validity parameter to the credentials, in order to limit the accessibility for the vehicle to the wireless network and by sending it to a remote server, which may for example be a back-office server of the vehicle manufacturer, a sufficiently secure and yet convenient connecting procedure is achievable between the vehicle and the wireless network. As will be explained in more detail below, there are various possible parameters that may be used as validity parameters. One such parameter may be time. For instance, a time-based validity parameter may be given different values to limit the validity of the credentials for a particular vehicle. As an example, such values may include a certain period of time, such as number of hours or days, or expressed as a range (such as from a starting hour/date to an ending hour/date), etc.

It should furthermore be understood that the validity of the credentials may be individually assigned to different vehicles. Thus, the validity of the same credentials may expire sooner for one vehicle than for another. For example, if two vehicles from the same manufacturer are scheduled to come into the workshop, the workshop may, using the method disclosed herein, send the credentials to the back-office of the manufacturer with different validity parameter values assigned to the credentials for the two vehicles. Suitably, the back-office server may send the credentials to the vehicle or vehicles using telematics communication, such as 4G/5G. The communication from the workshop to the remote server, i.e., the sending of the credentials to the remote server, is suitably performed over a secured communication channel, e.g., it may be via a secure portal of the vehicle manufacturer, to which the workshop personnel may log in for sharing documents, credentials, work orders, etc.

It should also be understood that the various steps of the method may be performed at different points in time, and do not necessarily need to be performed without interruption. For instance, the sending to a remote server the credentials may in some exemplary embodiments be performed immediately after the validity parameter has been associated to the credentials. Thus, this may be made at an early stage, for example, when a booking of the vehicle repair is made, i.e., long before the vehicle actually arrives at the workshop. However, in other exemplary embodiments, the sending of the credentials to the remote server may be at a point in time when the vehicle has actually arrived at the workshop. This may, for instance, be performed automatically, for instance in connection with scanning a number plate of the vehicle when arriving at the area of the workshop, which may trigger the sending of the credentials to the remote server.

The various steps of the computer-implemented method may suitably be performed by a computer, server, or any suitable local control unit at the workshop. Such a local control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the micropro- cessor, microcontroller or programmable digital signal pro- cessor mentioned above, the processor may further include computer executable code that controls operation of the programmable device.

The wireless local network may for example be a Wi-Fi network, but the teachings of the present disclosure may also be implemented for other wireless local networks.

The credentials may, for instance, include a certificate, a token or a password/passcode. Generally, a certificate is considered to offer a higher level of security.

As mentioned previously, the validity parameter may, for instance, be time-based. This is reflected in at least one exemplary embodiment. Thus, according to at least one exemplary embodiment, the at least one validity parameter comprises a time-based validity parameter, setting the valid- ity of the credentials for the vehicle to a limited period of time. As mentioned above, the limited period of time, may be set as an absolute number such as expressed in hours or days, or it may be expressed as a range, for example the credentials being valid from a starting to a stopping time/ date. Thus, when the vehicle has received the credentials from the remote server (such as from a telematics server of the back-office of the vehicle manufacturer) then the vehicle may scan for wireless local networks and when finding the relevant network, the vehicle may send a request including the credentials. If the credentials are still valid the vehicle will be allowed to connect, however, if the credentials have expired or have not yet become valid (the vehicle may have arrived at the wrong date) then the vehicle will be denied wireless access to the workshop.

According to at least one exemplary embodiment, the at least one validity parameter comprises a location-based validity parameter, setting the credentials for the vehicle to be valid on the condition that the vehicle is within a defined area. By setting such a criterion, the connection to the wireless local network may be controlled based on the location of the vehicle. The location-based validity param- eter may be designed in various ways. For instance, it may be defined as a maximum distance from a certain point in the workshop, or the location-based validity parameter may include geographical values, such as coordinates or coordi- nate ranges. For instance, by means of geofencing, it can be established if the vehicle is within the perimeters of the workshop or not, and thus whether or not connection should be allowed. It may also be the case that the validity param- eter limits the connection to certain locations of the work- shop but not to other locations of the workshop.

Although the present disclosure only requires one validity parameter to be associated to said credentials, according to an optional exemplary embodiment, the method comprises associated two or more validity parameters to said creden- tials, wherein the step of checking the at least one validity parameter comprises checking all validity parameters asso- ciated to said credentials to determine that the credentials are still valid for the vehicle. For instance, in such exemplary embodiments, there may be a time-based validity parameter as well as a location-based validity parameter, wherein both are checked for validity to allow and/or maintain connec- tion.

According to at least one exemplary embodiment, the step of associating at least one validity parameter to said creden- tials, comprises receiving via a user interface one or more parameter values for said at least one validity parameter. This is advantageous as the workshop personnel may, for instance based on the content of the work order, determine suitable values for the validity parameter. For example, the personnel may estimate if the work on the vehicle can be completed in a short time period or a long time period and may set a time-based validity parameter accordingly. The workshop personnel may suitably enter the validity param- eter by means of a processing unit with appropriate user interface, such as by means of a computer, tablet or a cell phone. Thus, the user interface may, for example, comprise a touchscreen, a keyboard, a pointing device (mouse) or a combination thereof.

According to at least one exemplary embodiment, the method further comprises, before the step of sending to a remote server said credentials:

associating to said credentials an identifier of the vehicle, such as a registration plate identifier and/or chassis number, and when the vehicle has arrived to the workshop, confirming the identifier of the vehicle before sending said creden- tials to the remote server.

This is advantageous as the association of the credentials to an identifier may be performed in advance, e.g., as soon as a work order has been received. When the vehicle arrives at the workshop, the credentials may suitably be sent auto- matically to the remote server. For instance, the identifier of the vehicle may be confirmed by means of a camera when the vehicle arrives at the workshop, or by sending a request to the tachograph system of the vehicle. When the identity of the vehicle has been confirmed, this may trigger an automatic transmission of the credentials to the remote server and consequently be provided to the vehicle.

According to at least one exemplary embodiment, the method comprises, when the vehicle is connected to the wireless local network:

upon determination that the credentials are no longer valid, disconnecting the wireless local network from the vehicle.

Thus, the checking of the validity of the credentials may not only be used at the time when the vehicle is to be connected to the wireless local network, but also subse- quently to determine that it may stay connected. According to at least some exemplary embodiments, the credentials may suitably be erased from the vehicle ECU memory after or simultaneously with the disconnection. Such erasing may suitably be automatic.

According to at least one exemplary embodiment, the method comprises, when the vehicle has been connected to the wireless local network, disconnecting the wireless local network from the vehicle upon receipt of an input signal representative of a closing
of a repair/service order for the vehicle, or when an allowable time limit for the vehicle to use the
wireless local network expires, or when it is determined that the vehicle moves beyond a
defined area.

The last two points may be configured as the previously
discussed time-based validity parameter and location-based
validity parameter, respectively. However, another possibility for disconnecting the vehicle from the wireless local
network may be made by the above mentioned input signal
representative of a closing of a repair/service order for the
vehicle. Thus, such an input signal may override the determination of whether or not the credentials are still valid, or
the input signal may modify the existing validity parameters.
When the workshop personnel has completed its work on the
vehicle, they can simply enter this via a user interface, which
may then automatically trigger the disconnection of the
wireless network from the vehicle.

According to a second aspect of the present disclosure,
there is provided a computer program comprising program
code means for performing the steps of the method of the
first aspect, including any embodiment thereof, when said
program is run on a computer. The advantages of the
computer program of the second aspect are largely analogous to the advantages of the method of the first aspect,
including any embodiment thereof.

According to a third aspect of the present disclosure, there
is provided a computer readable medium carrying a computer program comprising program code means for performing the steps of the method of the first aspect, including any
embodiment thereof, when said program product is run on a
computer. The advantages of the computer readable medium
of the third aspect are largely analogous to the advantages of
the method of the first aspect, including any embodiment
thereof.

According to a fourth aspect of the present disclosure,
there is provided a control unit for controlling the connecting of a vehicle to a wireless local network of a workshop,
the control unit being configured to perform the steps of the
method of the first aspect, including any embodiment
thereof. The advantages of the control unit of the fourth
aspect are largely analogous to the advantages of the method
of the first aspect, including any embodiment thereof.

Generally, all terms used in the claims are to be interpreted according to their ordinary meaning in the technical
field, unless explicitly defined otherwise herein. All references to "a/an/the element, apparatus, component, arrangement, device, means, step, etc." are to be interpreted openly
as referring to at least one instance of the element, apparatus,
component, arrangement, device, means, step, etc., unless
explicitly stated otherwise. The steps of any method disclosed herein do not have to be performed in the exact order
disclosed, unless explicitly stated. Further features of, and
advantages with, the present disclosure will become apparent when studying the appended claims and the following
description. The skilled person realizes that different features of the present disclosure may be combined to create
embodiments other than those described in the following,
without departing from the scope of the claims.

BRIEF DESCRIPTION OF THE DRAWINGS

With reference to the appended drawings, below follows
a more detailed description of embodiments the present
disclosure cited as examples.

In the drawings.

DETAILED DESCRIPTION

Figure 1:
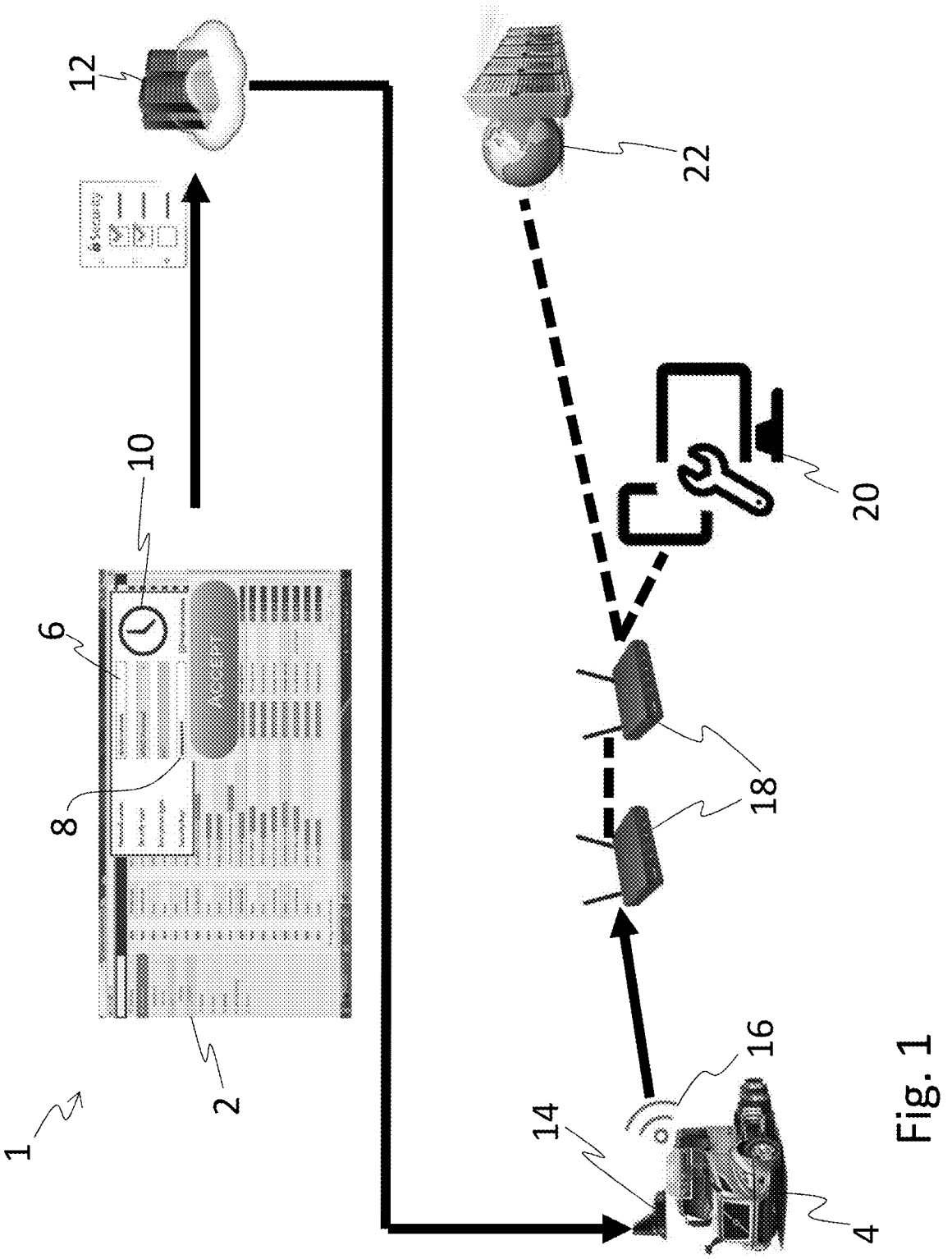
FIG. 1 is a general overview of a method according to at
least one exemplary embodiment of the present disclosure.

The present disclosure will now be described more fully
hereinafter with reference to the accompanying drawings, in
which certain aspects are shown. The aspects may, however,
be embodied in many different forms and should not be
construed as limited to the embodiments and aspects set
forth herein; rather, the embodiments are provided by way of
example so that this disclosure will be thorough and complete, and will fully convey the scope of the invention to
those skilled in the art. Accordingly, the skilled person will
recognize that many changes and modifications may be
made within the scope of the appended claims. Like reference numerals refer to like elements throughout the description.

FIG. 1 is a general overview of a computer-implemented
method 1 according to at least one exemplary embodiment
of the present disclosure. In FIG. 1 a screenshot is shown.
This may represent a computer 2 of a workshop. In FIG. 1
there is also shown a vehicle 4 which will undergo repair,
diagnosis, service, or some other work at the workshop. The
vehicle 4 is here represented by a heavy-duty vehicle in the
form of a truck, however, the general inventive concept may
be implemented for other types of vehicles as well.

The computer 2 of the workshop may be a personal
computer (PC) such as in a reception of the workshop, or as
part of a diagnostic tool, or in the form of any other suitable
control unit. The computer 2 comprises a software which
may include at least one wireless local network configuration. Suitably, there may be a list of wireless local network
configurations as shown in the screenshot. In case there is a
list, e.g., a list of Wi-Fi SSIDs, they may be presented in an
order of priority. Thus, the computer 2 identifies at least one
wireless local network configuration 6, which is readable by
the workshop personnel. The at least one wireless local
network configuration 6 is associated with credentials 8 for
using the wireless local network. The credentials 8 may for
example comprise a password or be based on a certificate.
Such a certificate may be downloaded through the workshop
software.

The computer 2 is configured to associate at least one
validity parameter 10 to said credentials 8 in order to allow
limited accessibility for the vehicle 4 to be connected to the
wireless network. The computer 2 may receive a value of
such a validity parameter 10 from the workshop personnel.
The validity parameter 10 may, for example be a time-based
validity parameter which defines the conditions on which the
vehicle 4 may initiate the connection and stay connected to
the wireless local network. It may, for example, be a date
range. Another validity parameter 10 may be location-based, in which the location of the vehicle 4 should be at or within a defined location/area. Such different conditions may also be combinable, requiring each condition to be fulfilled. The personnel may also enter for which vehicle or vehicles the credentials 8 are intended. Different validity parameters 10 and/or different validity parameter values may be chosen for different vehicles. It should be understood that there are various possibilities in this regards. The workshop personnel may decide that an automatic connection to the wireless local network will work for all the vehicles owned by the dealer (provided the credentials are valid), that all the vehicles planned to come to the workshop today or any other specified day, a single vehicle identified using its number plate or chassis number, etc.

After the association of the at least one validity parameter 10 has been done, the computer 2 sends the credentials 8 to a remote server 12. This may, e.g., be a telematics back-office server 12, which may forward (e.g., through 4G/5G) to the vehicle 4 the credentials 8 associated with the identified wireless local network configuration 6. The vehicle may suitably be equipped with appropriate telematics interface 14 (e.g., 4G/5G interface). This is performed in a secured manner with established authenticated communication between the remote server 12 and the vehicle 4 or vehicles.

By means of a wireless communications interface, for example a Wi-Fi interface 16, the vehicle 4 may detect several wireless local network configurations that match with the ones in the configured list. The vehicle 4 might also detect a single wireless local network configuration 6 which is accessible via one or more access points 18 spread around the workshop. To select the proper one, the vehicle 4 may connect to the one with the highest signal strength. It may, additionally or alternatively, follow an order of priority defined in the configuration list. In case the vehicle 4 moves within the workshop it may apply such a connection procedure several times using a threshold (e.g., signal strength or available bandwidth) to determine when to leave an access point 18 and connect to another one.

Upon receipt of a connection request including the credentials 8 from the vehicle 4, the computer 2 will check the at least one validity parameter 10 to determine that the credentials 8 are still valid for the vehicle 4. Upon determination that the credentials 8 are still valid, the vehicle 4 will be allowed to connect to the wireless local network of the workshop. In case the vehicle 4 faces problems connecting, it is possible to request relaunch of the connection from the software of the computer 2 (or other workshop tool). In case the vehicle 4 becomes disconnected due to invalid validity parameter (e.g., the time for repairing the vehicle 4 takes longer than what was initially expected when setting a time-based validity parameter 10), then it may also be possible to request such a relaunch.

Once the connection between the vehicle 4 and the wireless local network of the workshop has been established, the wireless local network may allow traffic between the vehicle 4, a diagnostic tool 20 and servers on the Internet 22.

Although not illustrated in FIG. 1, the status of the vehicle's connection may suitably be monitored. For enabling a good follow-up of the vehicle 4, it may be possible to get a status from the vehicle 4 if it is connected and to which wireless local network and display the status in a corresponding network configuration tool in the software of the workshop. The status information can be provided on the workshop IT network or via telematics. For some status information, such as the issue of connecting/reconnecting, it may run via telematics before reaching the software of the workshop tool.

Figures 2, 3, 4:
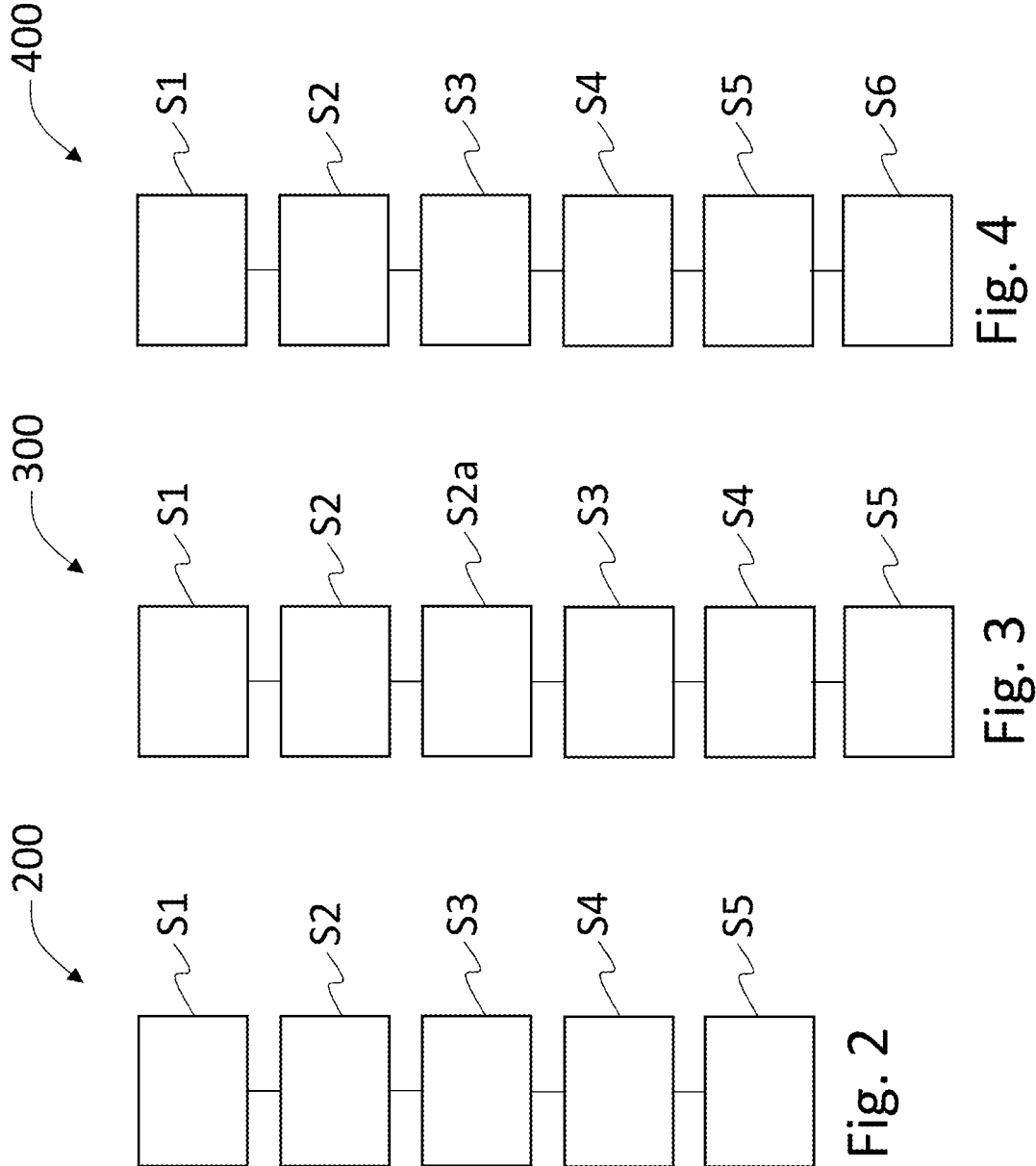
FIG. 2 is a schematic illustration of a method according
to at least one exemplary embodiment of the present disclosure.
FIG. 3 is a schematic illustration of a method according
to at least another exemplary embodiment of the present
disclosure.
FIG. 4 is a schematic illustration of a method according
to at least a further exemplary embodiment of the present
disclosure. [0035] FIG. 5 schematically illustrates a control
unit according to at least one exemplary embodiment of the
present disclosure.

FIG. 2 is a schematic illustration of a method 200 according to at least one exemplary embodiment of the present disclosure. More particularly, it illustrates a computer-implemented method 200 for connecting a vehicle to a wireless local network of a workshop, comprising:

in a step S1, identifying at least one wireless local network configuration of the wireless local network, said wireless local network configuration being associated with credentials for using said wireless local network, in a step S2, associating at least one validity parameter to said credentials in order to allow limited accessibility for the vehicle to said wireless local network, in a step S3, sending to a remote server said credentials, thereby enabling said credentials to be provided to the vehicle, in a step S4, upon receipt of a connection request including the credentials from the vehicle, checking the at least one validity parameter to determine that the credentials are still valid for the vehicle, and in a step S5, upon determination that the credentials are still valid, allowing the vehicle to connect to the wireless local network of the workshop.

FIG. 3 is a schematic illustration of a method 300 according to at least another exemplary embodiment of the present disclosure. It comprises all the steps of the method 200 in FIG. 2. However, before the step S3, i.e., before the sending the credentials to a remote server said, the method 300 in FIG. 3 further comprises, in a step S2a:

associating to said credentials an identifier of the vehicle, such as a registration plate identifier and/or chassis number, and when the vehicle has arrived to the workshop, confirming the identifier of the vehicle before sending said credentials to the remote server.

Thus, the step S2a comprises the partial steps of associated the identifier and confirming the identifier.

FIG. 4 is a schematic illustration of a method 400 according to at least a further exemplary embodiment of the present disclosure. The method 400 comprises all the steps of the method 200 in FIG. 2, and further comprises, when the vehicle has been connected to the wireless local network, in a step S6, disconnecting the wireless local network form the vehicle:

upon receipt of an input signal representative of a closing of a repair/service order for the vehicle, or when an allowable time limit for the vehicle to use the wireless local network expires, or when it is determined that the vehicle moves beyond a defined area.

In at least some exemplary embodiments, step S6 may simply be, upon determination that the credentials are no longer valid, disconnecting the wireless local network from the vehicle.

It should be noted that, in a modification of the method 400 in FIG. 4, it may also comprise the step S2a in the method 300 in FIG. 3.

Figures 5, 6:
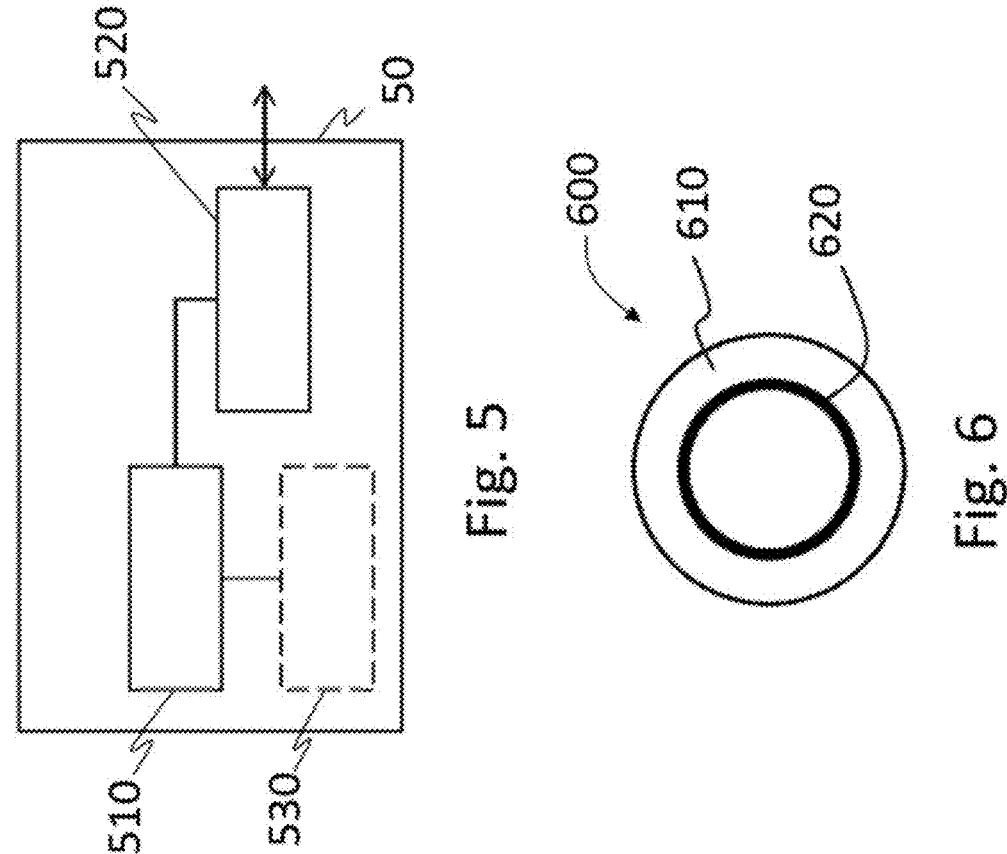
FIG. 6 schematically illustrates a computer program product according to at least one exemplary embodiment of the
present disclosure.

FIG. 5 schematically illustrates a control unit 50 according to at least one exemplary embodiment of the invention. In particular, FIG. 5 illustrates, in terms of a number of functional units, the components of a control unit 50 according to exemplary embodiments of the discussions herein. The control unit 50 may comprise or be comprised in a computer or the like, such as a computer discussed in connection with FIG. 1. Processing circuitry 510 may be provided using any combination of one or more of a suitable central processing unit CPU, multiprocessor, microcontroller, digital signal processor DSP, etc., capable of executing software instructions stored in a computer program product, e.g., in the form of a storage medium 530. The processing circuitry 510 may further be provided as at least one application specific integrated circuit ASIC, or field programmable gate array FPGA.

Particularly, the processing circuitry 510 is configured to cause the control unit 50 to perform a set of operations, or steps, such as the methods discussed above in connection to FIGS. 2-4. For example, the storage medium 530 may store the set of operations, and the processing circuitry 510 may be configured to retrieve the set of operations from the storage medium 530 to cause the control unit 50 to perform the set of operations. The set of operations may be provided as a set of executable instructions. Thus, the processing circuitry 510 is thereby arranged to execute exemplary methods as herein disclosed.

The storage medium 530 may also comprise persistent storage, which, for example may be any single one or combination of magnetic memory, optical memory, solid state memory or even remotely mounted memory.

The control unit 50 may further comprise an interface 520 for communications with at least one external device such as a keyboard, monitor, routers, external servers, etc. As such, the interface 520 may comprise one or more transmitters and receivers, comprising analogue and digital components and a suitable number of ports for wireline or wireless communication.

The processing circuitry 510 controls the general operation of the control unit 50, e.g., by sending data and control signals to the interface 520 and the storage medium 530, by receiving data and reports from the interface 520, and by retrieving data and instructions form the storage medium 530. Other components, as well as the related functionality, of the control unit 50 are omitted in order not to obscure the concepts presented herein.

FIG. 6 schematically illustrates a computer program product 600 according to at least one exemplary embodiment of the invention. More specifically, FIG. 6 illustrates a computer readable medium 610 carrying a computer program comprising program code means 620 for performing the methods exemplified in FIGS. 2-4, when said program product is run on a computer. The computer readable medium 610 and the program code means 620 may together form the computer program product 600.

The invention claimed is:

1. A computer-implemented method for connecting a vehicle to a wireless local network of a workshop, comprising:
    identifying, by a local control unit, at least one wireless local network configuration of the wireless local network, said wireless local network configuration being associated with credentials for using said wireless local network, wherein the local control unit is local to the workshop;
    associating, by the local control unit, at least one validity parameter to said credentials in order to allow limited accessibility for the vehicle to said wireless local network;
    sending, by the local control unit, to a remote server said credentials, thereby enabling said credentials to be provided to the vehicle;
    upon receipt of a connection request including the credentials from the vehicle, checking, by the local control unit, the at least one validity parameter to determine that the credentials are still valid for the vehicle; and
    upon determination that the credentials are still valid, allowing, by the local control unit, the vehicle to connect to the wireless local network of the workshop.

2. The method according to claim 1, wherein the at least one validity parameter comprises a time-based validity parameter, setting the validity of the credentials for the vehicle to a limited period of time.

3. The method according to claim 1, wherein the at least one validity parameter comprises a location-based validity parameter, setting the credentials for the vehicle to be valid on the condition that the vehicle is within a defined area.

4. The method according to claim 1, further comprising associating two or more validity parameters to said credentials, wherein the step of checking the at least one validity parameter comprises checking all validity parameters associated to said credentials to determine that the credentials are still valid for the vehicle.

5. The method according to claim 1, wherein the step of associating at least one validity parameter to said credentials, comprises receiving via a user interface one or more parameter values for said at least one validity parameter.

6. The method according to claim 1, further comprising, before the step of sending to a remote server said credentials:
    associating to said credentials an identifier of the vehicle, such as a registration plate identifier and/or chassis number, and
    when the vehicle has arrived to the workshop, confirming the identifier of the vehicle before sending said credentials to the remote server.

7. The method according to claim 1, further comprising:
    when the vehicle is connected to the wireless local network:
        upon determination that the credentials are no longer valid, disconnecting the wireless local network from the vehicle.

8. The method according to claim 1, further comprising:
    when the vehicle has been connected to the wireless local network, disconnecting the wireless local network form the vehicle:
        upon receipt of an input signal representative of a closing of a repair/service order for the vehicle, or
        when an allowable time limit for the vehicle to use the wireless local network expires, or
        when it is determined that the vehicle moves beyond a defined area.

9. A non-transitory computer readable medium comprising instructions, which when executed by the processing circuitry, cause the processing circuitry to perform the method of claim 1.

10. A local control unit for controlling the connecting of a vehicle to a wireless local network of a workshop, the local control unit being configured to:
    identifying at least one wireless local network configuration of the wireless local network, said wireless local network configuration being associated with credentials for using said wireless local network, wherein the local control unit is local to the workshop;
    associating at least one validity parameter to said credentials in order to allow limited accessibility for the vehicle to said wireless local network;
    sending to a remote server said credentials, thereby enabling said credentials to be provided to the vehicle;
    upon receipt of a connection request including the credentials from the vehicle, checking the at least one validity parameter to determine that the credentials are still valid for the vehicle; and upon determination that the credentials are still valid, allowing the vehicle to connect to the wireless local network of the workshop.

11. The control unit according to claim 10, wherein the at least one validity parameter comprises a time-based validity parameter and the control unit is further configured to set the validity of the credentials for the vehicle to a limited period of time.

12. The control unit according to claim 10, wherein the at least one validity parameter comprises a location-based validity parameter and the control unit is further configured to set the credentials for the vehicle to be valid on the condition that the vehicle is within a defined area.

13. The control unit according to claim 10, wherein the control unit is further configured to associate two or more validity parameters to said credentials, wherein the step of checking the at least one validity parameter comprises checking all validity parameters associated to said credentials to determine that the credentials are still valid for the vehicle.

14. The control unit according to claim 10, wherein the step of associating at least one validity parameter to said credentials comprises receiving via a user interface one or more parameter values for said at least one validity parameter.

15. The control unit according to claim 10, wherein the control unit is further configured to, before the step of sending to a remote server said credentials:

associate to said credentials an identifier of the vehicle, such as a registration plate identifier and/or chassis number, and when the vehicle has arrived to the workshop, confirm the identifier of the vehicle before sending said credentials to the remote server.

16. The control unit according to claim 10, further comprising:

when the vehicle is connected to the wireless local network:

upon determination that the credentials are no longer valid, disconnecting the wireless local network from the vehicle.

17. The control unit according to claim 10, wherein the control unit is further configured to:

when the vehicle has been connected to the wireless local network, disconnect the wireless local network form the vehicle:

upon receipt of an input signal representative of a closing of a repair/service order for the vehicle, or when an allowable time limit for the vehicle to use the wireless local network expires, or when it is determined that the vehicle moves beyond a defined area.

\*   \*   \*   \*   \*